United States Patent [19]
Balzano et al.

[11] Patent Number: 5,229,994
[45] Date of Patent: Jul. 20, 1993

[54] BRIDGE FOR CONNECTING AN IEEE 802.3 LOCAL AREA NETWORK TO AN ASYNCHRONOUS TIME-DIVISION MULTIPLEX TELECOMMUNICATION NETWORK

[75] Inventors: Jean-Michel Balzano, Perros-Guirec; Yvon Noslier, Lannion, both of France

[73] Assignee: Alcatel Cit, Paris, France

[21] Appl. No.: 766,547

[22] Filed: Sep. 27, 1991

[30] Foreign Application Priority Data

Sep. 27, 1990 [FR] France ............................. 90 11943

[51] Int. Cl.$^5$ ............................................. H04J 3/08
[52] U.S. Cl. ................................. 370/85.13; 370/79; 370/94.2
[58] Field of Search .................. 370/85.13, 85.14, 79, 370/92, 94.2

[56] References Cited

U.S. PATENT DOCUMENTS

| | | | |
|---|---|---|---|
| 4,823,124 | 4/1989 | Beauchemin | 370/61 X |
| 5,079,765 | 1/1992 | Nakamura | 370/85.13 |
| 5,086,426 | 2/1992 | Tsukakoshi et al. | 370/85.14 X |

OTHER PUBLICATIONS

French Search Report, Areste Canosa Examiner.
Int'l Switching Symposium, Stockholm, May 28-Jun. 1, 1990, vol. 2, pp. 9-14; J. P. Quiquis et al. "Data services and LANs interconnection using ATM technique".
IEEE Int'l Conference on Communications, Toronto, 22-25 Jun. 1986, vol. 2, pp. 1255-1259; A. Albanese et al.: "An architecture for transparent MAN/LAN gateways".
IEEE Global Telecommunications Conference, Hollywood, Fla., 28 Nov. -1 Dec. 1988, vol. 3, pp. 1791-1997; D. Japel et al.: "LAN/ISDN interconnect via frame relay".

Primary Examiner—Douglas W. Olms
Assistant Examiner—Russell Blum
Attorney, Agent, or Firm—Sughrue, Mion, Zinn, Macpeak & Seas

[57] ABSTRACT

A bridge for connecting an IEEE 802.3 local area network to an asynchronous time-division multiplex telecommunication network comprises a part implementing the functions of layer 2.1 of an asynchronous time-division multiplex telecommunication network transmission protocol and a part which is a conventional local area network interface implementing the functions of layer 1 of the local area network data transmission protocol. The circuit is applicable to the transmission of data between different local area networks.

1 Claim, 2 Drawing Sheets

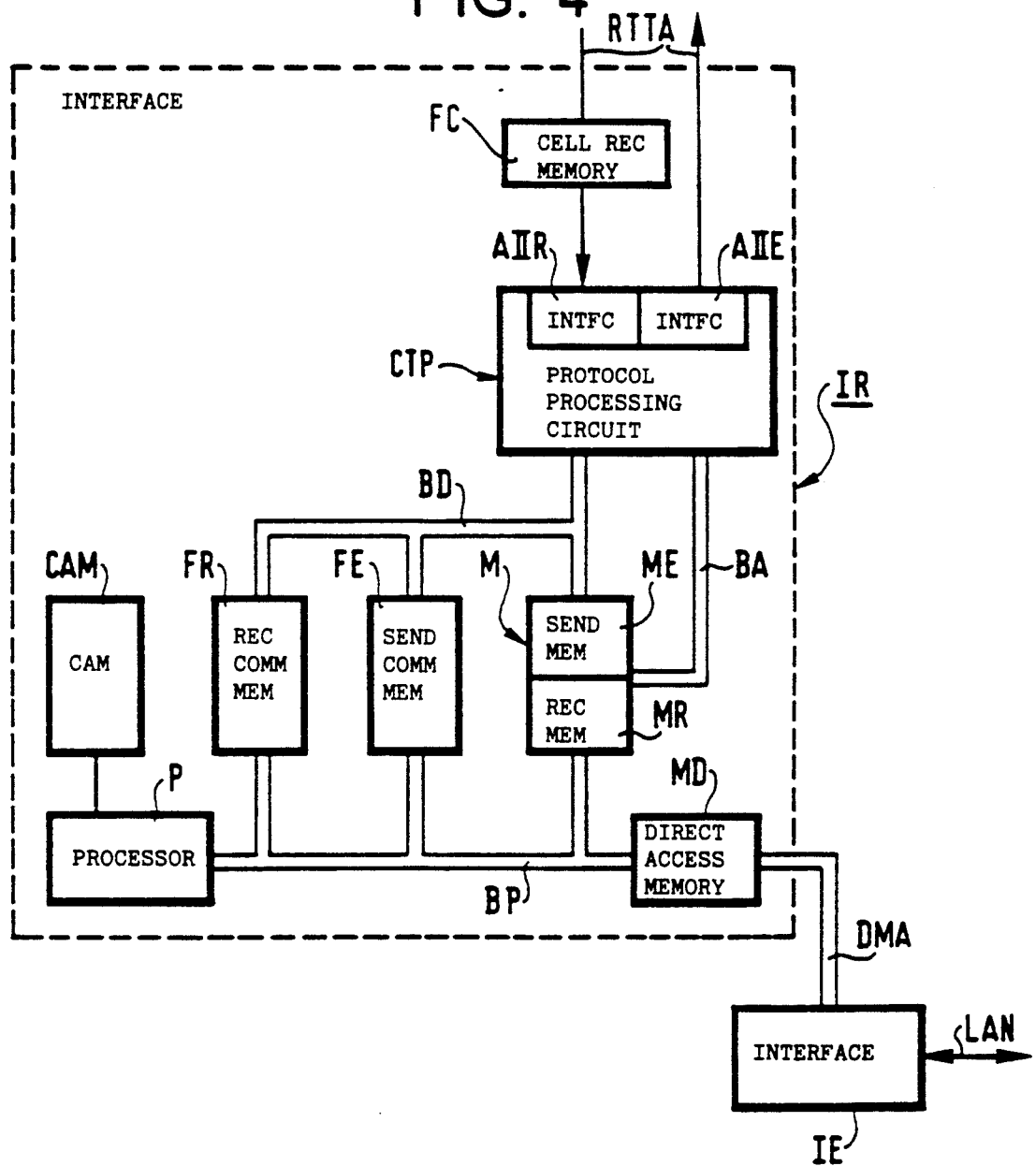

BRIDGE FOR CONNECTING AN IEEE 802.3 LOCAL AREA NETWORK TO AN ASYNCHRONOUS TIME-DIVISION MULTIPLEX TELECOMMUNICATION NETWORK

BACKGROUND OF THE INVENTION

1. Field of the invention

The invention concerns a bridge for connecting an IEEE 802.3 local area network to an asynchronous time-division multiplex telecommunication network. This type of local area network is characterized by a carrier detection and collision detection access method. It is marketed under the tradename ETHERNET, among others.

2. Description of the prior art

It is often desirable to transmit data from one local area network to another via a telecommunication network. When this is a conventional synchronous time-division multiplex telecommunication network, a known technique is to connect each local area network to the telecommunication network by means of a leased line having a bit rate of 2 Mbit/s for each direction using a device called a bridge. A known type bridge transmits in full the content of frames carried by the local area network bus, including the header and synchronization bits which are of no relevance to the link to another local area network. The drawback of synchronous time-division multiplex telecommunication networks for linking local area networks is that the bit rate is limited to 2 Mbit/s.

It is known that future asynchronous time-division multiplex telecommunication networks will enable data to be transmitted at much higher bit rates, up to 600 Mbit/s. The journal Revue des Telecommunications, volume 62, No 3/4/1988 describes a protocol for data transmission in an asynchronous time-division multiplex telecommunication network between stations internal or external to the network. French patent application No 89 04168 describes a signalling message processor implementing this protocol.

The functions of layer 2.1 of an asynchronous time-division multiplex telecommunication network data transmission protocol are:

- to detect transmission errors by means of cyclic redundancy check bits;
- to detect lost cells by means of numbering bits placed in a field of each cell provided for check bits;
- to segment the data of a message before transmitting it in the form of cells each containing 28 data bytes;
- to reassemble the data of each message after the cells containing them are received.

An object of the present invention is to propose a bridge for connecting each IEEE 802.3 local area network to an asynchronous time-division multiplex telecommunication network using a known protocol for data transmission in an asynchronous time-division multiplex telecommunication network, in particular the protocol described in the abovementioned documents, to provide a high bit rate link between widely separated local area networks.

SUMMARY OF THE INVENTION

The present invention consists in a bridge for connecting an IEEE 802.3 local area network to an asynchronous time-division multiplex telecommunication network comprising:

first means implementing the functions of layer 2.1 of a data transmission protocol of the asynchronous time-division multiplex telecommunication network;

second means implementing the functions of layer 1 of a data transmission protocol in the local area network, said second means being connected to said first means.

Seen from the stations connected to it, this bridge is similar to a basic local area network, namely: wide bandwidth, typically 10 Mbit/s; total connectivity; low error rate; no routing or congestion problems; high overall traffic. The physical link between the bridge and the telecommunication network is very simple because asynchronous time-division multiplexing means that a single physical medium such as an optical fibre is sufficient.

The invention will be better understood and other features of the invention will emerge from the following description and the accompanying figures.

BRIEF DESCRIPTION OF THE DRAWINGS

FIG. 4 is a block diagram of one implementation of a bridge in accordance with the invention.

DETAILED DESCRIPTION OF THE INVENTION

Figure 1:
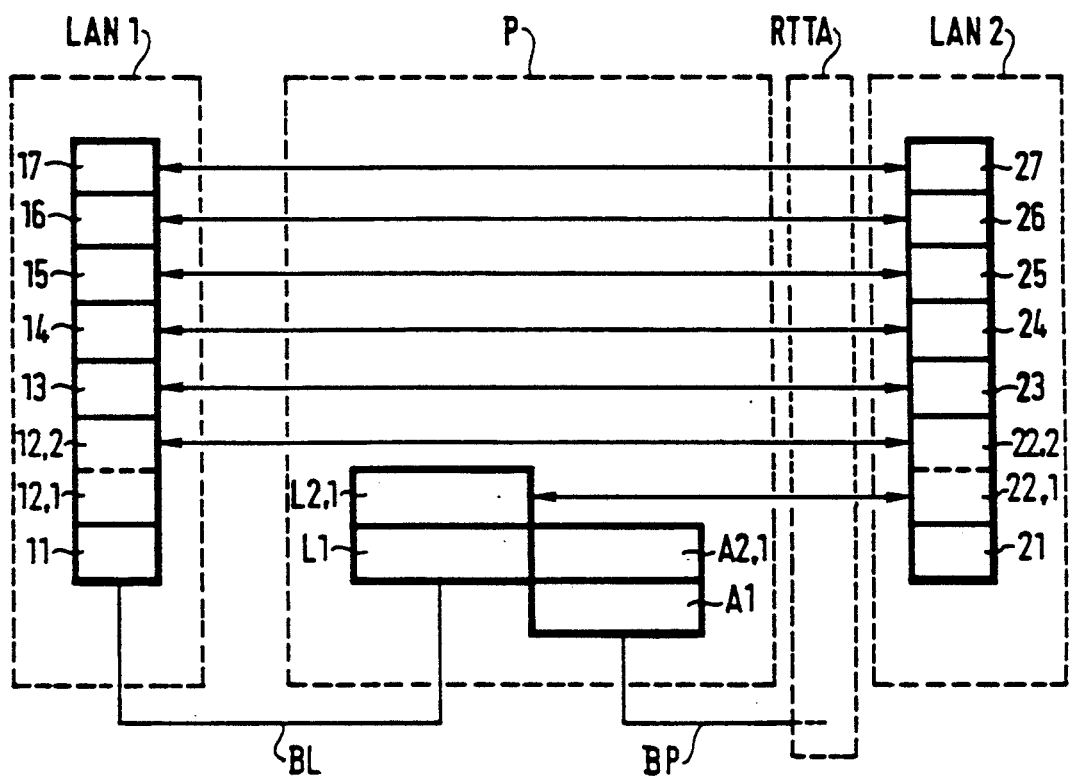
FIG. 1 shows communication between layers of the ISO reference model showing the protocols in two local area networks, a bridge in accordance with the invention and an asynchronous time-division multiplex telecommunication network.

FIG. 1 shows the seven layers 11, 12.1–12.2, 13, 14, 15, 16, 17 of the protocol used by each station of a first local area network LAN1. The mechanisms implemented by each layer are respectively: physical, link (medium access control—logical link control), network, transport, session, presentation, application. A second local area network LAN2 uses a protocol comprising seven layers 21 through 27. A bridge P in accordance with the invention and an asynchronous time-division multiplex telecommunication network RTTA connect the local area network LAN1 to the network LAN2. The bridge P implements the physical layer L1 and the medium access control layer L2.1 of the LAN1 protocol. The medium access control layer L2.1 communicates with its counterpart layer 22.1 in the LAN2 protocol. Layers 12.2 through 17 of the LAN1 protocol communicate directly with layers 22.2 through 27 of the LAN2 protocol, the bridge P and the telecommunication network RTTA being fully transparent end to end for these layers.

A physical link BL connects LAN1 layer 11 to bridge P layer L1. A physical link BP connects bridge P layer A1 to the RTTA network.

The bridge P implements layer No 2.1 (designated A2.1) of the data transmission protocol in the RTTA telecommunication network and the physical layer No 1 of this protocol to access the RTTA network. The bridge P provides communication between the physical layer L1 of the LAN1 protocol and the layer A2.1 of the data transmission protocol.

In an IEEE 802.3 local area network, data is transmitted in the form of frames having a variable length between 64 and 1,518 bytes. Each station has its own address. The asynchronous time-division multiplex method is characterized by the multiplexing onto a common medium of cells having a fixed length of, for example, 36 bytes comprising an identifying header of four bytes and a usable content of 32 bytes. Each communication has a corresponding header. The bit rate of the medium is independent of that of the communications that it carries. A bridge in accordance with the invention therefore implements the following functions:

in the telecommunication network to local area network direction:

reconstituting a local area network frame from a plurality of telecommunication network cells;

analyzing the frame destination address and rejecting the frame if its address does not match a station present in the local area network connected to the bridge;

listening on the local area network bus, waiting until it is idle and then transmitting a reconstituted frame;

in the local area network to telecommunication network direction:

storing each frame received from the local area network;

rejecting said frame if the destination address matches a station present in the local area network connected to the bridge in question;

recognizing the start and the end of each IEEE 802.3 frame;

subdividing the data and the cyclic redundancy check code into sections having the same length as the wanted data of a cell;

constituting cells complying with the information transmission protocol in the asynchronous time-division multiplex telecommunication network and transferring them to said telecommunication network.

Each communication cell in the RTTA network comprises 36 bytes, that is four header bytes and 32 usable bytes.

Figure 2:
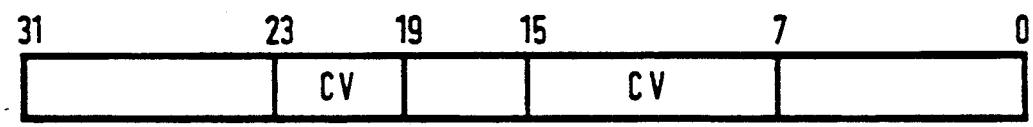
FIG. 2 shows the structure of the header of a cell transmitting data in an asynchronous time-division multiplex compatible form.

FIG. 2 shows a header which comprises twelve virtual circuit number bits identifying the communication to which the cell belongs. These twelve bits are the bits 8 through 15 and 20 through 23 marked CV in the figure. The remaining 16 bits 0 through 7, 16 through 19 and 24 through 31 include a header error detector and corrector field and various bits that are not relevant to the application under consideration.

Figure 3:
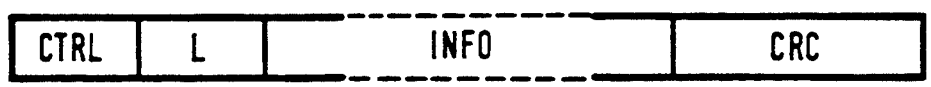
FIG. 3 shows the structure of the wanted bits of a cell.

FIG. 3 shows the useful content of a cell. It comprises:

check byte CTRL comprising a start of message indicator bit, an end of message indicator bit, a length indicator byte present indicator bit and five cell number bits, modulo 32;

a byte L indicating the usable length of the information contained in the INFO field;

an information field INFO;

two cyclic redundancy check bytes CRC relating to the 32 bytes of the cell.

If the length byte present indicator bit has the value 1, the byte after the check byte is a byte which indicates the number of usable bytes in the INFO field. This comprises a maximum of 28 usable bytes. If the indicator bit has the value 0, the byte after the check byte is an information byte and there are therefore 29 usable bytes in the INFO field.

FIG. 4 is a block diagram of one implementation of a bridge in accordance with the invention. It comprises a first part IR providing the functions of layer 2.1 of the data transmission protocol of the RTTA telecommunication network and a second part IE providing the functions of the physical layer (layer 1) of the data transmission protocol of the local area network LAN1. The part IR comprises: a protocol processing circuit CTP; a cell memory FC; a data memory M; a send command memory FE; a receive command memory FR; a processor P which processes layer No 2.2 (logical link control) of the telecommunication network data transmission protocol; a content addressable memory CAM; and a memory MD accessible directly without passing through the processor P.

The data memory M constitutes a buffer in which data passing across the bridge is stored. The memory M is a double ported memory which avoids bus allocation problems in order to optimize the transfer speed between the processing circuit CPT and the processor P. The memories FE, FR, M and MD and the processor P are connected by a processor bus BP. The send command memory FE and the receive command memory FR are FIFOs and provide dialog between the processing circuit CTP and the processor P. The memories FE, FR and M are connected to the processing circuit CTP by a data bus BD. The memory M is connected direct to the processing circuit CTP by an address bus BA.

The second part IE of the bridge is a conventional local area network interface complying with the IEEE 802.3 standard which is available as an off the shelf integrated circuit. The part IE of the circuit is connected to the part IR by a DMA link to the direct access memory MD.

The protocol processing circuit may be a programmable logic array (PLA) such as the XILINX XC3090. The processing circuit CTP comprises an interface AIIE for transmitting data to the RTTA telecommunication network and an interface AIIR for receiving data from the RTTA telecommunication network. The data memory M is divided into a transmit memory ME and a receive memory MR for respectively storing data to the telecommunication network and data from this network.

The frames supplied by the local area network LAN are converted into cells and cells provided by the RTTA telecommunications network are converted into IEEE 802.3 frames. These two functions are implemented by means of the double ported memory M. These functions are enabled by management of these two ports in read mode and in write mode. The two functions are totally asynchronous. Access conflict is resolved by reserving part of the memory for reading while another part is reserved for writing.

The interface IE has direct memory access DMA to the memory MD which is connected to the processor P by the bus BP. The memory MD contains: a list of receive page descriptors reserved for messages received from the local area network; a list of receive page descriptors reserved for messages to send to the telecommunication network; receive pages; transmit pages; initialization data supplied by the processor for the interface IE; and a working area for the processor P. The interface IE receives without stopping them all frames carried by the local area network LAN. Only frames received correctly, having a length between 64 and 1,518 bytes and free of errors are stored in the memory MD, including the cyclic redundancy check word.

An interrupt advises the processor P of the arrival of a frame that the interface IE has stored in the memory MD. The processor P extracts the destination address and looks up a previously provided address table to determine whether this frame must be rejected or not. If the frame is not addressed to a station recognized by the bridge as being a station of the local area network LAN, if the destination address is not unknown and if it is not identified in the address table as an address that must be rejected, the processor P transfers the frame into the memory M, in the transmit part ME. It then releases the memory locations of the memory MD that previously contained this frame.

The transmit part ME of the memory M has two main parts:

a data part in which are stored messages to be processed and to be transmitted to the telecommunication network, each area having sufficient capacity to receive a maximum length message (1,518 bytes);

a context part used to memorize the transmission of cells.

There is a context for each of the local area networks accessible via the bridge. Access to these local area networks via the telecommunication network is indicated by the presence of a virtual circuit number CV in the content of a cell. The transmission context for a virtual circuit contains the number of the next cell to be transmitted on that virtual circuit.

When a message is transmitted the processor P writes the complete message into one of the two data areas of the memory ME and then advises the protocol processing circuit CTP that a message requires to be processed by writing into the memory FE a command indicating the number of bytes in the message to be transmitted and the number of the virtual circuit on which the message is to be transmitted. The virtual circuit number is obtained from the frame destination address by means of the content addressable memory CAM.

The protocol processing circuit CTP scans the state of the memory FE regularly, at the end of each message and scans the memory FE again. If it is not empty, it carries out the following operations:

it reads a command in the memory FE;

it initializes a count of bytes remaining to transmit;

it sends the header of the first cell of the message to be transmitted, including the virtual circuit number supplied by the command;

it sends a check byte;

it updates the context part of the memory ME by writing into it the number of the next cell on this virtual circuit;

it sends the length byte;

it reads 28 bytes in the data area of the memory ME, as specified in the command, and then sends these bytes;

it sends two cyclic redundancy check bytes calculated for the 36 bytes of the cell;

it sends cells again until the byte count is exhausted.

Cells received by the protocol processing circuit CTP from the RTTA telecommunication network pass through an FIFO type memory FC for changing the bit rate. This memory is written at 15.6 Mbytes/s and read at 2 Mbytes/s. The receive cells are then written into the receive part MR of the double ported memory M. This receive part comprises: a circular buffer formed of areas of 28 bytes; descriptors associated with the various areas; a context part used to sequence cells and to identify the first area containing the message received on a given circuit.

The cell receive processing algorithm is as follows. The protocol processing circuits CTP reads:

the header of a receive cell, storing the virtual circuit number internally;

the check byte;

the length byte.

The protocol processing circuit CTP reads in the memory M:

the context associated with the received virtual circuit;

the descriptor associated with the data area indicated by a current pointer.

Based on the analysis of the check byte bits, the processing circuit CTP detects any cell sequencing errors and any loss of cells in a long message. If any error is detected the message being received is aborted and is not transmitted to the processor P.

The processor P reads the memory FR when the latter changes from the empty to the non-empty state, because at this time the processing circuit CTP generates an interrupt to the processor P. The processor P then scans FR for each message read, until it finds the empty memory. The process whereby the processor P reads the message is as follows:

it reads the command in the memory FR;

it reads the descriptor of the area containing the start of the message, the address of which is indicated by the command, in order to access the virtual circuit number of the message to read;

in the case of a single-cell message, it reads the data area for the descriptor;

in the case of a long message, it scans the descriptors of the same virtual circuit from the first area until it finds an end of message indicator bit and then reads the data for the descriptors retained.

A clock is also available in the memory M. It is a counter incremented by the processing circuit CTP in each period corresponding to one cell. When a message is signalled the current time is written into the command. When the processor reads the memory FR it will know the time of the message by comparing the time given by the command with the current time. This prevents the processing of messages that are too old.

Knowing all this information, the processor P can reconstitute a frame conforming to the local area network protocol. The processor P first verifies that the frame length is correct, in other words between 64 and 1,518 bytes. It then extracts the destination address and looks up its table of local area network station addresses to check that the frame is addressed to a station in the local area network to which it is connected. It then verifies the availability of the transmit buffers in the memory MD which are accessible via the interface IE. If all these conditions are met, the processor P transfers the frame into the transmit buffers and sends a transmit instruction to the interface IE.

When it is ready, the interface IE recovers this frame, adds to it a preamble conforming to the local area network protocol and then transmits it on the local area network in accordance with the access procedure. When transmission has been completed successfully, the interface IE returns to the processor P the buffers that were occupied by this frame and alerts it by means of an interrupt. If a frame does not meet any of the previous conditions concerning its length or address it is rejected by the processor P which does not transmit it to the interface IE.

The scope of the invention is not limited to the embodiment described above. Numerous variant embodiments will suggest themselves to the man skilled in the art.

There is claimed:

1. A bridge for connecting an IEEE 802.3 local area network to an asynchronous time-division multiplex telecommunication network, said bridge comprising:

first means implementing the functions of layer 2.1 of a data transmission protocol of the asynchronous time-division multiplex telecommunication network, said first means comprising a protocol processing circuit implementing the functions of level 2.1 of a telecommunication network data transmission protocol, a data memory, a processor, a send command memory, a receive command memory, a direct access memory, a cell receive memory for storing cells received from the telecommunication network and supplying them to the protocol processing circuit, a data bus connected to the protocol processing circuit, to the data memory, to the command memories and to the direct access memory, an address bus connected to the protocol processing circuit and to the data memory, and a processor bus connected to the processor, to the direct access memory, to the data memory and to said command memories; and second means implementing the functions of layer 1 of a data transmission protocol in the local area network, said second means being connected to said first means and comprising a physical interface circuit appropriate to the local area network connected to the processor by the direct access memory.

* * * * *